(12) United States Patent
Zamani et al.

(10) Patent No.: US 12,097,469 B2
(45) Date of Patent: Sep. 24, 2024

(54) CROSS-FLOW MEMBRANE FILTRATION CHANNEL

(71) Applicant: NANYANG TECHNOLOGICAL UNIVERSITY, Singapore (SG)

(72) Inventors: Farhad Zamani, Singapore (SG); Jia Wei Chew, Singapore (SG); Ebrahim Akhondi, Singapore (SG); William Bernard Krantz, Singapore (SG); Anthony Gordon Fane, Singapore (SG); Yong Zen Tan, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 16/089,310

(22) PCT Filed: Mar. 28, 2017

(86) PCT No.: PCT/SG2017/050157
§ 371 (c)(1),
(2) Date: Sep. 27, 2018

(87) PCT Pub. No.: WO2017/171638
PCT Pub. Date: Oct. 5, 2017

(65) Prior Publication Data
US 2019/0282965 A1  Sep. 19, 2019

(30) Foreign Application Priority Data
Mar. 28, 2016  (SG) ............ 10201602393R

(51) Int. Cl.
*B01D 65/08*  (2006.01)
*B01D 63/06*  (2006.01)
(Continued)

(52) U.S. Cl.
CPC ............ *B01D 65/08* (2013.01); *B01D 63/06* (2013.01); *B01D 63/08* (2013.01); *B01D 69/043* (2013.01);
(Continued)

(58) Field of Classification Search
CPC ...... B01D 65/08; B01D 69/043; B01D 63/08; B01D 63/06; B01D 2321/2008;
(Continued)

(56) References Cited

U.S. PATENT DOCUMENTS 3,416,985 A * 12/1968 Dounoucos ............ B01D 63/08
156/289
3,909,418 A *  9/1975 Hunter .................. B01D 69/10
210/336

(Continued)

FOREIGN PATENT DOCUMENTS

WO    2006130815 A2    12/2006
WO    2017171638 A1    10/2017

OTHER PUBLICATIONS

Foreign Communication from a Related Counterpart Application, International Search Report and Written Opinion dated Jun. 9, 2017 International Application No. PCT/SG2017/050157 filed on Mar. 28, 2017.
(Continued)

*Primary Examiner* — Magali P Slawski
*Assistant Examiner* — Bernadette Karen McGann
(74) *Attorney, Agent, or Firm* — Conley Rose, P.C.

(57) ABSTRACT

A cross-flow membrane filtration channel defined by at least one membrane, wherein at least one surface of the channel is inclined at an angle away from a centreline of the channel in a direction of feed flow in the channel.

10 Claims, 5 Drawing Sheets

(51) Int. Cl.
  *B01D 63/08* (2006.01)
  *B01D 63/16* (2006.01)
  *B01D 69/04* (2006.01)
(52) U.S. Cl.
  CPC .......... *B01D 63/16* (2013.01); *B01D 2313/14* (2013.01); *B01D 2315/10* (2013.01); *B01D 2321/20* (2013.01); *B01D 2321/2008* (2013.01)
(58) Field of Classification Search
  CPC ............ B01D 2315/10; B01D 2313/14; B01D 2321/02; B01D 63/02; B01D 63/04; B01D 2313/08; B01D 2313/10; B01D 2313/143; B01D 2201/02; B01D 2321/2025; B01D 63/16; B01D 2321/20; B01D 35/005; B01D 2257/708; B01D 2257/702; B01J 19/0093; B01J 19/2415; B01J 19/2425; B01J 19/244; B01J 19/2475; B01J 2219/00792; B01J 2219/00797; B01J 2219/0086; B01J 2219/00869; B01J 2219/00907; B01J 2219/1946; C02F 1/52; C02F 2303/24; C02F 1/42; C02F 2001/422; C02F 2001/425; C02F 2001/427; C02F 1/40; C02F 1/444; C10K 1/00; C10K 1/002; C10K 1/024; C10L 3/101
  See application file for complete search history.

(56) References Cited

U.S. PATENT DOCUMENTS

| | | | |
|---|---|---|---|
| 4,212,742 A | 7/1980 | Solomon et al. | |
| 4,968,600 A | 11/1990 | Haraguchi et al. | |
| 2007/0144969 A1* | 6/2007 | Gordon | C02F 1/44 210/650 |
| 2015/0118122 A1* | 4/2015 | Chyou | C01B 3/16 422/187 |
| 2015/0274891 A1* | 10/2015 | Konradi | B01D 71/62 427/244 |

OTHER PUBLICATIONS

Iritani, E., Y. Murakami, and T. Murase, Concentration of Colloidal Solution by Single-Pass Ultrafiltration Using Hollow Fiber Membrane Module, Journal of Chemical Engineering of Japan, Dec. 31, 1995. vol. 28, No. 5: p. 614-616.

Zamani, F., H.J. Tanudjaja, E. Akhondi, W.B. Krantz, A.G. Fane, and J. W. Chew, Flow-Field Mitigation of Membrane Fouling (FMMF) via Manipulation of the Convective Flow in Cross-Flow Membrane Applications, Journal of Membrane Science, Mar. 15, 2017. vol. 526: p. 377-386.

Bacchin P, Aimar P, Sanchez V. Model for Colloidal Fouling of Membranes. Aiche J. Feb. 1995;41(2):368-376.

Field RW, Wu D, Howell JA, Gupta BB. Critical Flux Concept for Microfiltration Fouling. J Membrane Sci. Apr. 28, 1995;100(3):259-272.

Howell JA. Subcritical Flux Operation of Microfiltration. J Membrane Sci. Nov. 15, 1995;107(1-2):165-171.

Li H, Fane AG, Coster HGL, Vigneswaran S. Direct observation of particle deposition on the membrane surface during crossflow microfiltration. J Membrane Sci. Oct. 14, 1998;149(1):83-97.

Pall Corporation "Understanding Direct Flow and Crossflow Microfiltration in Food and Beverage Industry Applications" https://www.pall.com/content/dam/pall/food-beverage/literature-library/non-gated/FBTADIRCROSSEN.pdf Jun. 2016.

Ortner, Kai, "Palladium gas separation membranes", Fraunhofer Institute for Surface Engineering and Thin Films IST, 3 pages, downloaded Mar. 15, 2023, https://www.ist.fraunhofer.de/en/technologies/pvd/hollow-cathode-process/pd-gasseparationmembranes.html.

"Semi-Permeable Membrane", 2 pages, downloaded Mar. 5, 2023, https://www.longdom.org/peer-reviewed-journals/semipermeable-membrane-6018.html.

Helmenstine, Anne Marie, Ph.D., "Selective Permeability Definition and Examples—Selectively Permeable Versus Semipermeable", ThoughtCo, Aug. 27, 2020, 6 pages, downloaded Mar. 15, 2023, https://www.thoughtco.com/selectively-permeable-4140327.

* cited by examiner

CROSS-FLOW MEMBRANE FILTRATION CHANNEL

FIELD

This invention relates to a cross-flow membrane filtration channel.

BACKGROUND

Out of the wide range of industries (e.g., water, environment, chemical, oil and gas, and food) needing membranes for filtration processes, water and wastewater treatment alone commands an enormous US$178 billion globally. Unfortunately, the endemic fouling phenomenon is such that the solutes and/or particulates tend to deposit on the membrane, thereby inhibiting the permeate flow across the membrane. Consequently, the operation has to be shut down and the membrane needs to be backwashed or replaced, which costs time and energy.

Cross-flow filtration has been proven to be effective for fouling control, especially in the filtration of feeds containing micron-size particles or flocs. However, cross-flow filtration is an energy-intensive method, since large amounts of energy is needed for the pumping of feed and permeate flows through the channels. Specifically, the energy (E) required in cross-flow filtration is proportional to $U^{2.8}$ for laminar flows (which represents the lower bound of energy consumption relative to turbulent flows), where U is the average flow velocity, which implies that increasing U for enhancing fouling control involves a significant increase in energy consumption. Notably, the fouling control in cross-flow filtration cannot be 100% efficient, because the permeate flux (J) in the direction of the membrane inevitably causes a percentage of the particles or flocs in the feed to have trajectories 60 that reach the membrane surface and potentially deposit, as depicted in FIG. 1 (prior art).

SUMMARY

According to a first aspect, there is provided a cross-flow membrane filtration channel defined by at least one membrane, wherein at least one surface of the channel is inclined at an angle away from a centreline of the channel in a direction of feed flow in the channel.

The at least one surface may comprise the at least one membrane.

The at least one membrane may be one of: a flat sheet membrane and a tubular membrane.

The channel may be defined by two membranes forming two surfaces and both surfaces may be inclined away from the centreline of the channel in the direction of feed flow in the channel.

The at least one surface may comprise a non-permeable wall of the channel.

A spacer insert may be provided in the channel at a downstream end of the channel to effect inclination of the at least one surface of the channel.

Feed flow in the channel may comprise flow of an oily feed.

According to a second aspect, there is provided a filtration module comprising a plurality of cross-flow membrane filtration channels, wherein each of the channels comprises a channel of the first aspect.

Each of the channels may be oriented with its feed flow direction opposite to feed flow direction of its adjacent channel.

Feed flow in the plurality of cross-flow membrane filtration channel may comprise flow of an oily feed.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
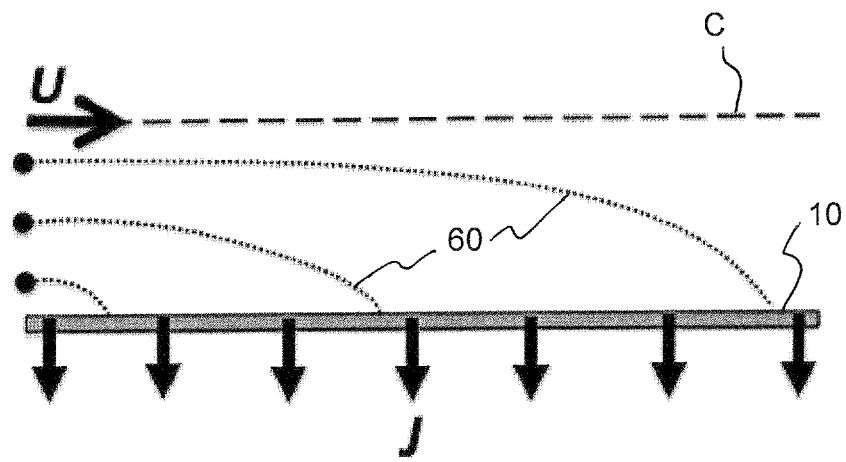
FIG. 1 (prior art) is a schematic cross-sectional illustration of a conventional cross-flow membrane filtration channel.

Exemplary embodiments of the cross-flow membrane filtration channel 100 will be described below with reference to FIGS. 1 to 9b. The same reference numerals are used to denote the same or similar parts among the various embodiments shown.

Membrane fouling is caused by the deposition of foulants on the membrane. The fouling phenomenon can be maximally mitigated if the foulants or particulates are prevented from depositing on the membrane in the first place. The present application discloses a flow field mitigation of membrane fouling (FMMF) in the form of a cross-flow membrane filtration channel 100 that can significantly mitigate fouling on the membrane surface in cross-flow membrane filtration. The cross-flow membrane filtration channel judiciously manipulates the flow field on the feed side of the membrane to direct the particles or flocs away from the membrane surface, thus minimizing any deposition (i.e., fouling).

Figure 2:
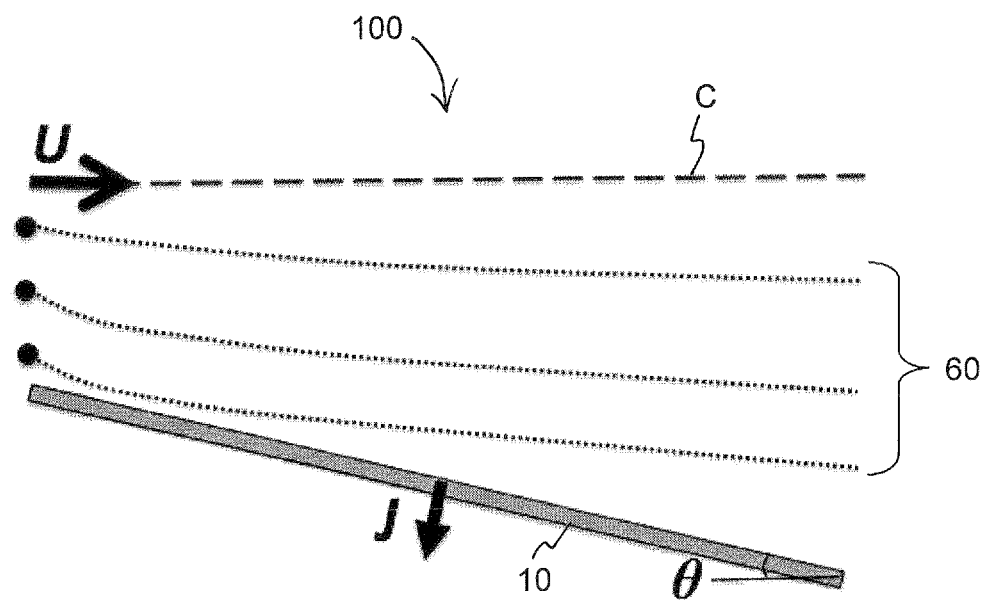
FIG. 2 is a schematic cross-sectional illustration of a first embodiment of a cross-flow membrane filtration channel of the present invention comprising a flat sheet membrane.

In a first embodiment of the cross-flow membrane filtration channel 100 as shown in FIG. 2, the membrane 10 is a flat-sheet membrane 10 and feed flows at an average velocity U in the channel 100. The flat-sheet membrane 10 forms a surface of the channel 100, and is inclined at an angle $\theta$ away from a centreline C of the channel 100 in the direction of feed flow, so that foulants in the feed embark on trajectories 60 away from instead of towards the membrane 10 surface to delay fouling and prolong the lifespan of the membrane 10. Using the cross-flow membrane filtration channel 100, the filtration process can be operated in the laminar regime, which requires lower energy compared to that in the conventional cross-flow setup, whereby filtration is operated in the energy-intensive turbulent regime in order to reduce fouling.

In the presently disclosed cross-flow membrane filtration channel 100, it should be understood that the mentioned centreline C of the channel 100 is an imaginary line that would have been the central longitudinal axis of the channel if no surface of the channel was inclined, as shown in FIG. 1 (prior art).

Figure 3:
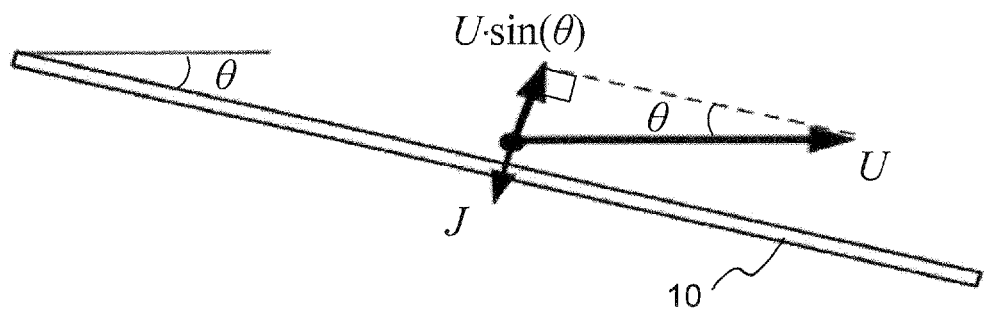
FIG. 3 is a schematic illustration of convective flow velocity components near a membrane surface of the cross-flow membrane filtration channel of FIG. 2.

The trajectories 60 of the foulants away from the membrane 10 shown in FIG. 2 are due to the convective flow away from the membrane 10 surface. Specifically, as illustrated in FIG. 3, the flow towards the membrane 10 is J (permeate flux) while the flow away from the membrane is $U \cdot \sin(\theta)$, where U is the cross-flow velocity in the direction along the channel and $\theta$ is the inclination angle. Since U is much larger than J in membrane applications, even for a $\theta$ value as minimal as 0.29°, the foulant is more likely to be directed away from rather than towards the membrane 10.

Figure 4:
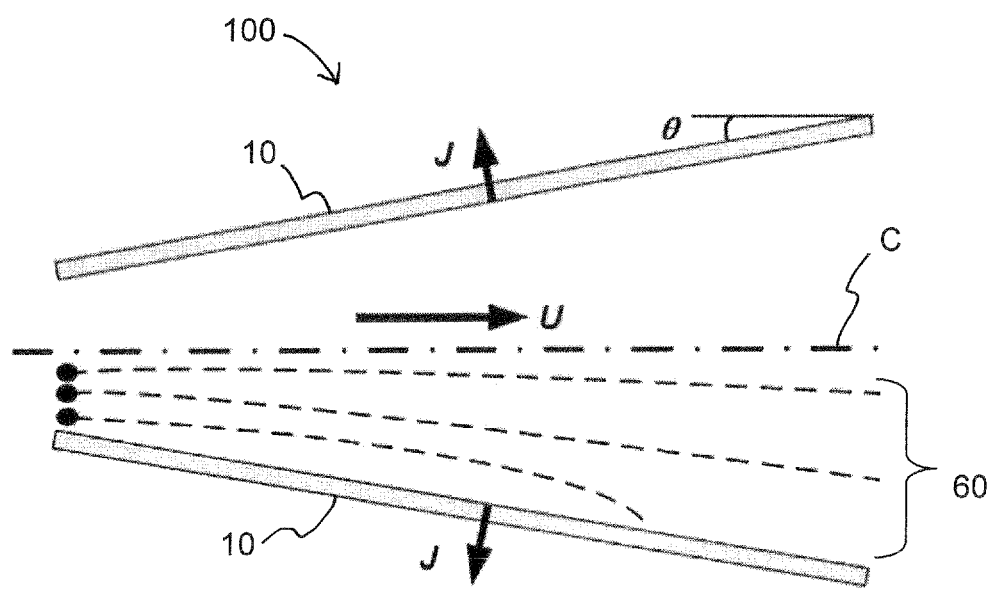
FIG. 4 is a schematic cross-sectional illustration of a second embodiment of the cross-flow membrane filtration channel comprising two flat sheet membranes.

In a second embodiment of the cross-flow membrane filtration channel 100 as shown in FIG. 4, the channel 100 is defined between two surfaces that each comprise a membrane 10 that is inclined at an angle $\theta$ away from the centreline C of the channel 100. Only the trajectories 60 of the particles below the channel centreline C are shown in FIG. 4, although in reality the trajectories 60 and permeate flux J are symmetrical about the centreline C.

Figure 5:
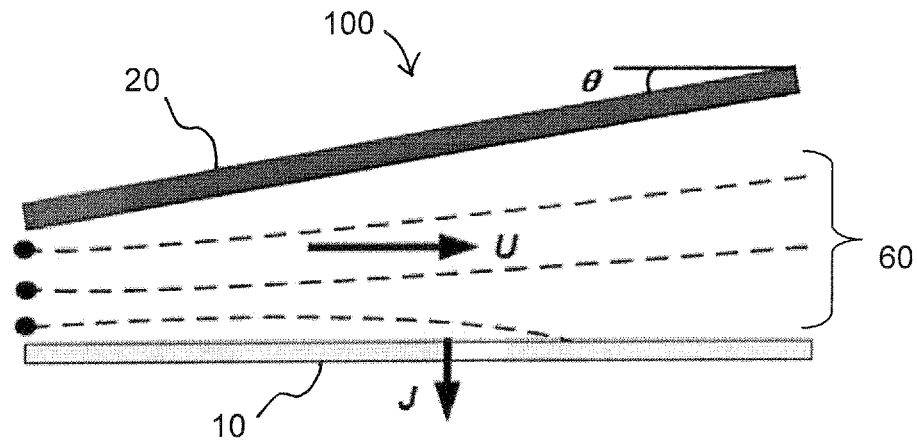
FIG. 5 is a schematic cross-sectional illustration of a third embodiment of the cross-flow membrane filtration channel comprising a flat sheet membrane and a non-permeable wall.

In a third embodiment of the cross-flow membrane filtration channel 100 as shown in FIG. 5, the channel 100 is defined by a first surface comprising a flat sheet membrane 10 and a second surface comprising a non-permeable wall 20. The membrane 10 is kept parallel to the direction of the feed velocity U, while the non-permeable channel wall 20 is inclined at an angle $\theta$ away from the centreline C of the channel 100.

From the above, it can be seen that in all embodiments, inclination of at least one surface of the channel 100 away from a centreline C of the channel 100 in the direction of feed flow gives rise to trajectories 60 of the foulant particles away from the membrane 10, thereby reducing fouling of the membrane 10. The surface may be one or more membranes 10 and/or a non-permeable wall 20 of the channel 100.

Figure 6:
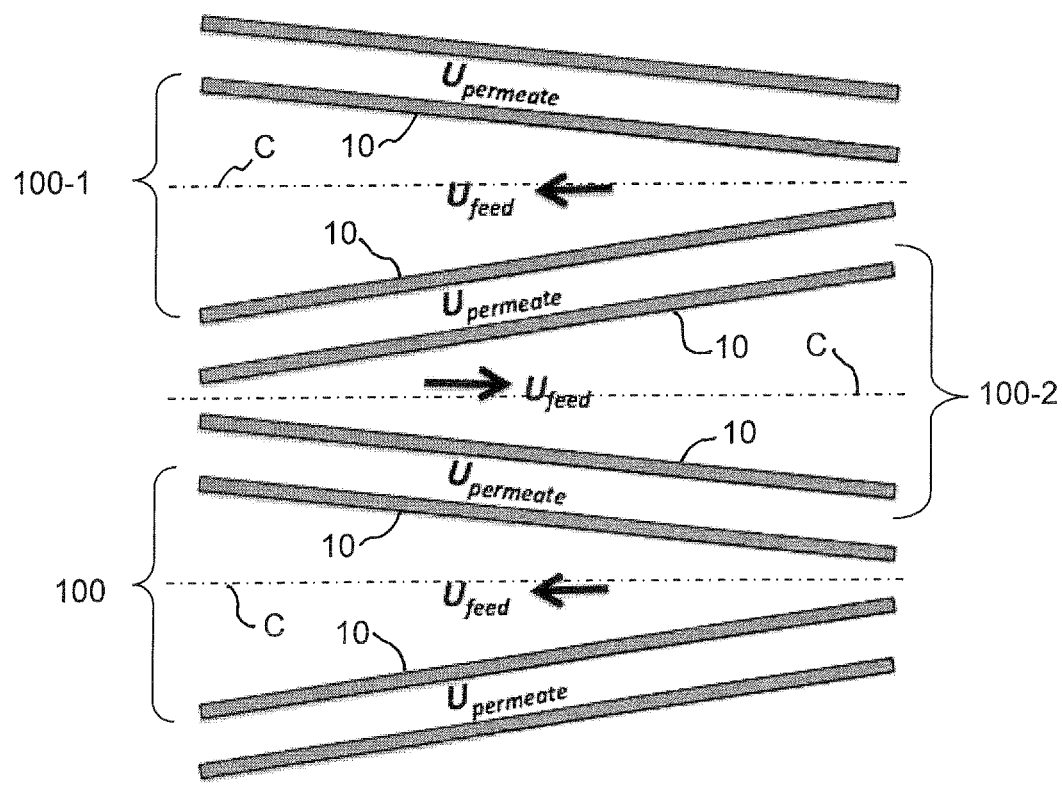
FIG. 6 is a schematic cross-sectional illustration of a cross-flow membrane filtration module comprising a plurality of the cross-flow membrane filtration channel of FIG. 4.

To reduce the footprint requirement of a filtration module comprising a plurality of the cross-flow membrane filtration channels 100 having symmetrically inclined membrane 10 surfaces (as shown in FIG. 4), the channels 100 may be vertically stacked and arranged so as to have inclination of the surfaces of adjacent channels 100 oriented in opposite directions, as shown in FIG. 6. In this configuration, feed flow is directed in a zigzag manner, so that direction of feed flow in one channel 100-1 is opposite to the direction of feed flow in an adjacent channel 100-2.

In alternative embodiments (not shown), the filtration module may comprise the other embodiments of the cross-flow membrane filtration channel 100 as described above, whether as a plurality of the same embodiment of the channel 100 or combining different embodiments of the channel 100 in a single filtration module in order to meet different filtration requirements.

Figure 7:
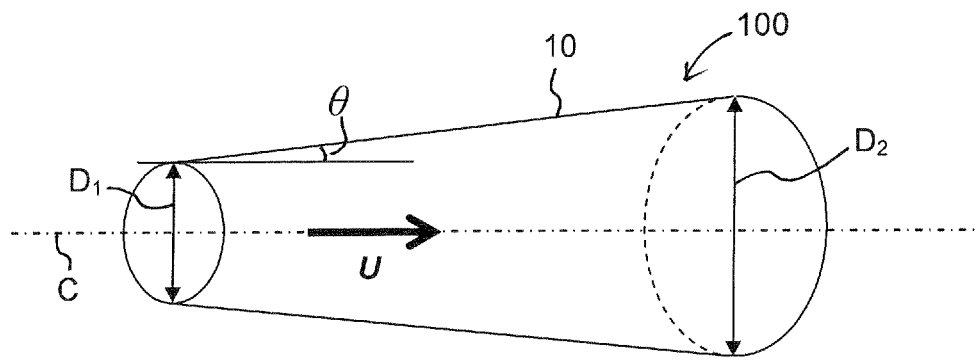
FIG. 7 is a schematic cross-sectional illustration of a fourth embodiment of the cross-flow membrane filtration channel comprising a tubular membrane.

It should be noted that the principle of operation of the presently disclosed channel 100 is applicable to all types of membranes and not only flat sheet membranes 10 as depicted in FIGS. 2 to 6. For example, a tubular or hollow-fibre membrane 10 that defines a channel 100 having a tubular surface may be configured to have increasing cross-sectional diameter, i.e. from a smaller diameter $D_1$ to a larger diameter $D_2$ along its length, as shown in FIG. 7, so that its lumen cross-sectional area increases with length. Feed is flowed with a velocity U in such a tubular membrane channel 100 in the direction from smaller to larger diameter of the channel 100, so that the membrane 10 surface of the channel 100 is inclined away from the centreline C of the channel 100 in the direction of feed flow.

For hollow fibres configured with the cross-flow membrane filtration channels, a structured arrangement for flow in a shell or tank in which the hollow fibres are placed is required. This brings an added benefit of reducing flow mal-distribution in shell side flow compared to random packing of hollow fibres in the shell.

Increase in the cross-sectional diameter of a tubular or hollow-fibre membrane 10 may be achieved by fabricating the membrane 10 such that its diameter increases along its length. Alternatively, this may be achieved by providing spacer inserts (not shown) within the tubular or hollow fibre membrane 10 at a downstream end of the membrane 10, thereby increasing the distance between the membrane 10 surface and the centreline C of the membrane channel 100 at its downstream end. In this way, the surface of the membrane 10 would incline away from the centreline C of the channel 100 in the direction of feed flow. Using spacer inserts allows the present cross-flow membrane filtration channels to be achieved in existing filtration modules without requiring re-design of entire module dimensions. The spacer inserts may be fabricated via 3D printing as wedge-shaped baffles, spacers or mandrels and would using them would simplify assembly of the tapered channels 100.

Similarly, spacer inserts (not shown) may be used in channels 100 comprising flat sheet membranes 10, or even in the channels 100 of reverse osmosis spiral wound membrane modules, to increase the height of the channels 100 in the direction of feed flow, thereby achieving inclination of a surface of the channel 100 away from the centreline C of the channel 100 in the direction of feed flow.

Simulations and experiments were performed that demonstrated the efficacy of the cross-flow membrane filtration channel 100 described in the various embodiments above. Computational fluid dynamics (CFD) simulations showed that, with the proper design of the flow channel 100, most particulate foulants can be directed away from the membrane 10 due to the induced transverse velocity component $U \sin(\theta)$ in the direction opposite to the permeate flux J. Notably, the induced vertical flowfield component curbs the fouling problem in conventional cross-flow channels (FIG. 1), wherein foulants are directed in the same direction as the permeate flux (i.e., towards the membrane).

To quantify the effectiveness of the present cross-flow membrane filtration channel 100 compared to conventional cross-flow channels, a deposition factor $\varphi$, defined as the percentage of foulants deposited on the membrane relative to the total amount of foulants entering the feed channel, can be calculated for various scenarios. In particular, the larger the $\varphi$ value is, the higher the fouling tendency is. CFD simulations were carried out for the configuration shown in FIG. 5 for four permeate fluxes (namely, 50, 100, 200 and 400 L/m² h) and three inclination angles, $\theta$ (namely, 0.29°, 0.58°, 1.15°). The parameters kept constant were channel inlet height of 2 mm, channel length of 20 cm and pump energy.

Figure 8:
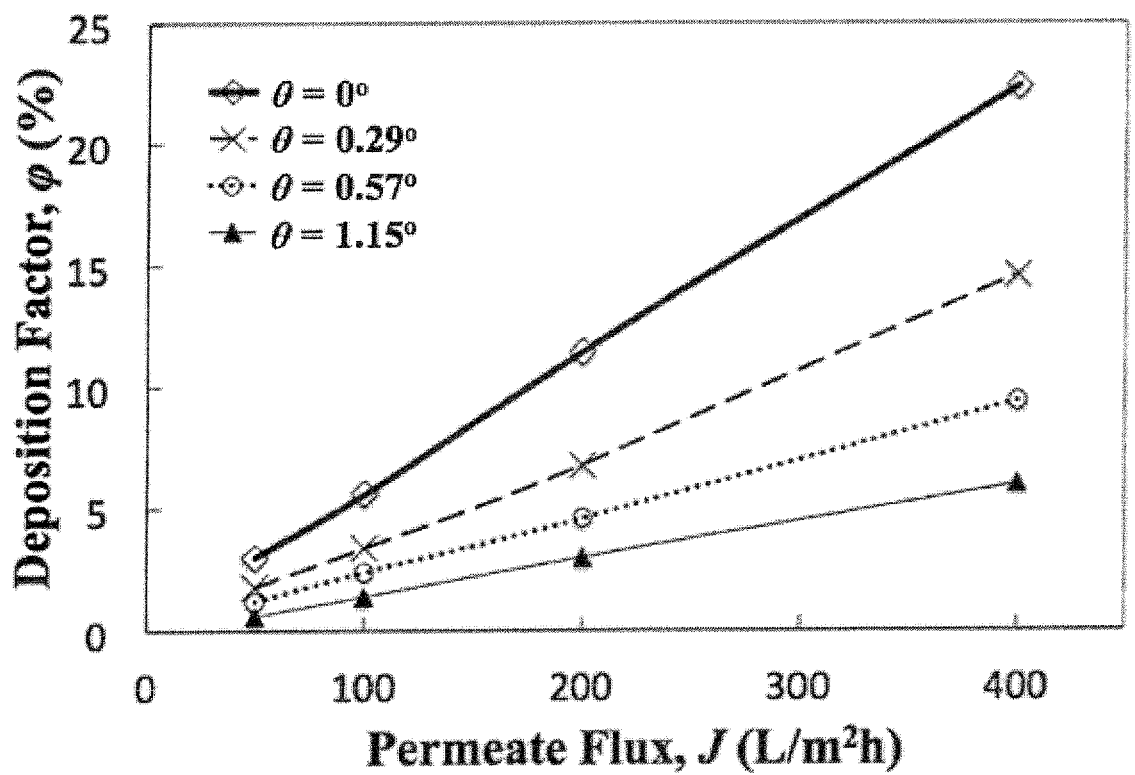
FIG. 8 is a graph of deposition factor ($\varphi$) corresponding to various J and $\theta$ values for the cross-flow membrane filtration channel of FIG. 5.

To maintain the same pump energy, a reference energy was used equivalent to that of the conventional cross-flow channel with a cross-flow velocity (U) of 0.1 m/s, while the U value in each case using the present cross-flow membrane filtration channel 100 was chosen such that the same pump energy was consumed. As seen in FIG. 8, inclinations as slight as θ=0.29° confer significant benefits in terms of reducing fouling (i.e., reduce the φ value). In particular, for the channel inlet height of 2 mm and channel length of 20 cm considered, an FMMF configuration per FIG. 3*b* with θ=0.57° corresponds to a channel outlet height of 4 mm and a twofold reduction in fouling tendency (i.e., the φ value is halved) vis-à-vis the conventional cross-flow configuration.

Figure 9A:
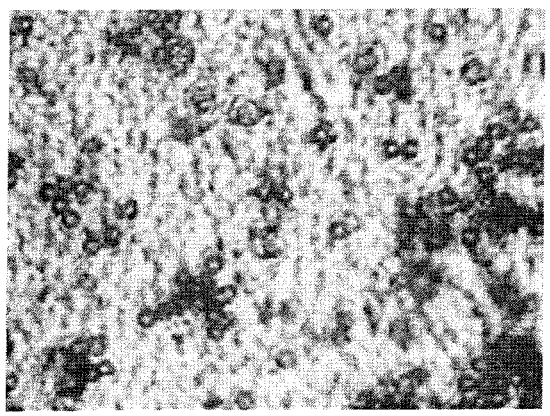
FIG. 9a is a DOTM image of deposition of particles at the membrane surface when flux was 20 L/m² h using a prior art conventional cross-flow filtration channel.
Figure 9B:
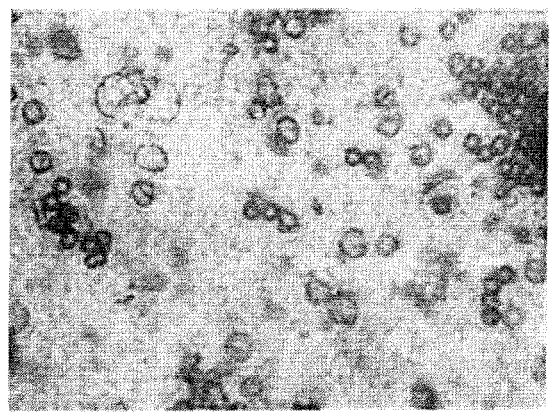
FIG. 9b is a DOTM image of deposition of particles at the membrane surface when flux was twofold at 40 L/m² h using the cross-flow membrane filtration channel of FIG. 5.

Efficacy of the cross-flow membrane filtration channel 100 was also established through bench-scale experimental studies employing the established technique of direct observation through the membrane (DOTM)[4]. Assessment of fouling is generally tied to the concept of 'Critical Flux'[1-3], which is the specific permeate flux value below which negligible fouling occurs, hence allows quantification of the degree of sustainability of a membrane filtration process. In particular, the larger the critical flux value is, the more sustainable the filtration process will be. Results obtained using the configuration in FIG. 5 with θ=1.15° showed that, with the same pump energy, an almost 100% increase in the critical flux value was achieved when the present cross-flow membrane filtration channel 100 was employed compared to the conventional cross-flow filtration channel (FIG. 1). Pictures taken via DOTM at the onset of deposition (i.e., critical flux) are presented in FIG. 9, which shows that the critical flux is 20 L/m$^2$ h in conventional cross-flow filtration (FIG. 9*a*), but doubled at 40 L/m$^2$ h when the FMMF technique was employed (FIG. 9*b*).

A more detailed comparison between the present cross-flow membrane filtration channel 100 and the conventional cross-flow setup is displayed in Table 1. When the same energy consumption is used as the basis, the present cross-flow membrane filtration channel 100 improves the permeate production rate twofold vis-à-vis the conventional cross-flow design. When the same permeate production rate is used as the basis, capital cost and energy consumption are halved while footprint (FIG. 6) is increased by a mere 1.3 times using the present cross-flow membrane filtration channel 100.

TABLE 1

| Parameters/Characteristics | Present Cross-Flow Membrane Filtration Channel | Conventional Cross-Flow Channel |
|---|---|---|
| Flux[a] | 2 | 1 |
| Capital cost[b] | 0.5 | 1 |
| Energy consumption[b] | 0.5 | 1 |
| Footprint[b] | 1.3 | 1 |

[a]Same energy consumption as basis for comparison
[b]Same permeate production as basis for comparison The present cross-flow membrane filtration channel 100 is particularly suited for membrane distillation of oily feeds as current methods face difficulties with membrane pore wetting problems. The induced trajectory of the oil droplets away from the membrane as a result of inclining at least surface of the channel reduces the likelihood of oil contacting the membrane, and thereby that of membrane pore wetting and the subsequent permeation of oil through the membrane.

Whilst there has been described in the foregoing description exemplary embodiments of the present invention, it will be understood by those skilled in the technology concerned that many variations and combination in details of design, construction and/or operation may be made without departing from the present invention. For example, in embodiments where the channel is defined by a membrane and a non-permeable wall, both the wall and the membrane may be inclined away from the centreline of the channel in the direction of feed flow.

REFERENCES

1. Bacchin P, Aimar P, Sanchez V. Model for Colloidal Fouling of Membranes. Aiche J. February 1995; 41(2): 368-376.
2. Field R W, Wu D, Howell J A, Gupta B B. Critical Flux Concept for Microfiltration Fouling. J Membrane Sci. Apr. 28, 1995; 100(3):259-272.
3. Howell J A. Subcritical Flux Operation of Microfiltration. J Membrane Sci. Nov. 15, 1995; 107(1-2):165-171.
4. Li H, Fane A G, Coster H G L, Vigneswaran S. Direct observation of particle deposition on the membrane surface during crossflow microfiltration. J Membrane Sci. Oct. 14, 1998; 149(1):83-97.

The invention claimed is:

1. A cross-flow membrane filtration channel used in filtration of a liquid feed, the channel comprising:
   an inlet and an outlet, wherein a centreline of the channel is defined from the inlet to the outlet;
   the liquid feed in the channel, the liquid feed comprising particulate foulants, wherein a direction of flow of the liquid feed in the channel is defined along the centreline from the inlet to the outlet of the channel; and
   at least one liquid-permeable membrane configured for filtration of the particulate foulants in the liquid feed based on size of the particulate foulants and for filtered liquid permeate to pass through the at least one liquid-permeable membrane, the channel being defined by the at least one liquid-permeable membrane,
   wherein at least one surface of the channel is inclined at an angle away from the centreline of the channel in the direction of liquid feed flow in the channel, such that the particulate foulants in the liquid feed embark on trajectories away from the at least one liquid-permeable membrane to thereby reduce fouling of the at least one liquid-permeable membrane.

2. The cross-flow membrane filtration channel of claim 1, wherein the at least one surface comprises the at least one liquid-permeable membrane.

3. The cross-flow membrane filtration channel of claim 2, wherein the at least one liquid-permeable membrane is one of: a flat sheet membrane, a tubular membrane, or a hollow fibre membrane.

4. The cross-flow membrane filtration channel of claim 2, wherein the channel comprises two liquid-permeable membranes, the channel being defined by the two liquid-permeable membranes that form two surfaces, and both surfaces are inclined away from the centreline of the channel in the direction of liquid feed flow in the channel.

5. The cross-flow membrane filtration channel of claim 1, wherein the at least one surface comprises a non-permeable wall of the channel.

6. The cross-flow membrane filtration channel of claim 1, wherein the channel comprises a spacer insert at a downstream end of the channel to effect inclination of the at least one surface of the channel.

7. The cross-flow membrane filtration channel of claim 1, wherein the liquid feed in the channel comprises an oily liquid feed.

8. A filtration module used in filtration of a liquid feed, the module comprising a plurality of cross-flow membrane filtration channels comprising:
the liquid feed in the channels, the liquid feed comprising particulate foulants; and
each of the channels in the plurality of cross-flow membrane filtration channels comprises a channel selected from at least one of:
A) a cross-flow membrane filtration channel comprising:
an inlet and an outlet, wherein a centreline of the channel is defined from the inlet to the outlet, wherein a direction of flow of the liquid feed in the channel is defined along the centreline from the inlet to the outlet of the channel; and
at least one liquid-permeable membrane configured for filtration of the particulate foulants in the liquid feed based on size of the particulate foulants and for filtered liquid permeate to pass through the at least one liquid-permeable membrane, the channel being defined by the at least one liquid-permeable membrane,
wherein at least one surface of the channel is inclined at an angle away from a centreline of the channel in a direction of liquid feed flow in the channel, and
wherein the at least one surface comprises the at least one liquid-permeable membrane;
B) a cross-flow membrane filtration channel comprising:
an inlet and an outlet, wherein a centreline of the channel is defined from the inlet to the outlet, wherein a direction of flow of the liquid feed in the channel is defined along the centreline from the inlet to the outlet of the channel; and
at least one liquid-permeable membrane configured for filtration of the particulate foulants in the liquid feed based on size of the particulate foulants and for filtered liquid permeate to pass through the at least one liquid-permeable membrane, the channel being defined by the at least one liquid-permeable membrane,
wherein at least one surface of the channel is inclined at an angle away from the centreline of the channel in the direction of liquid feed flow in the channel,
wherein the at least one surface comprises the at least one liquid-permeable membrane, and
wherein the at least one liquid-permeable membrane is one of: a flat sheet membrane, a tubular membrane, or a hollow fibre membrane;
C) a cross-flow membrane filtration channel comprising:
an inlet and an outlet, wherein a centreline of the channel is defined from the inlet to the outlet, wherein a direction of flow of the liquid feed in the channel is defined along the centreline from the inlet to the outlet of the channel; and
at least one liquid-permeable membrane configured for filtration of the particulate foulants in the liquid feed based on size of the particulate foulants and for filtered liquid permeate to pass through the at least one liquid-permeable membrane, the channel being defined by the at least one liquid-permeable membrane,
wherein at least one surface of the channel is inclined at an angle away from the centreline of the channel in the direction of liquid feed flow in the channel,
wherein the at least one surface comprises the at least one liquid-permeable membrane, and
wherein the channel comprises two liquid-permeable membranes forming two surfaces and both surfaces are inclined away from the centreline of the channel in the direction of liquid feed flow in the channel; or
D) a cross-flow membrane filtration channel comprising:
an inlet and an outlet, wherein a centreline of the channel is defined from the inlet to the outlet, wherein a direction of flow of the liquid feed in the channel is defined along the centreline from the inlet to the outlet of the channel; and
at least one liquid-permeable membrane configured for filtration of the particulate foulants in the liquid feed based on size of the particulate foulants and for filtered liquid permeate to pass through the at least one liquid-permeable membrane, the channel being defined by the at least one liquid-permeable membrane,
wherein at least one surface of the channel is inclined at an angle away from the centreline of the channel in the direction of liquid feed flow in the channel, and
wherein the at least one surface comprises a non-permeable wall of the channel, and
wherein the particulate foulants in the liquid feed in each of the channels embark on trajectories away from the respective at least one liquid-permeable membrane to thereby reduce fouling of the respective at least one liquid-permeable membrane.

9. The filtration module of claim 8, wherein each of the channels in the plurality of cross-flow membrane filtration channels comprises the channel of C), and wherein each channel in the plurality of cross-flow membrane filtration channels is oriented with its liquid feed flow direction opposite to a liquid feed flow direction of an adjacent channel in the plurality of cross-flow membrane filtration channels.

10. The filtration module of claim 8, wherein the liquid feed in the plurality of cross-flow membrane filtration channels comprises an oily liquid feed.

* * * * *